Sept. 28, 1926.  1,601,600
F. H. PERRY
AUTOMOBILE TRAFFIC SIGNAL
Filed Nov. 24, 1925
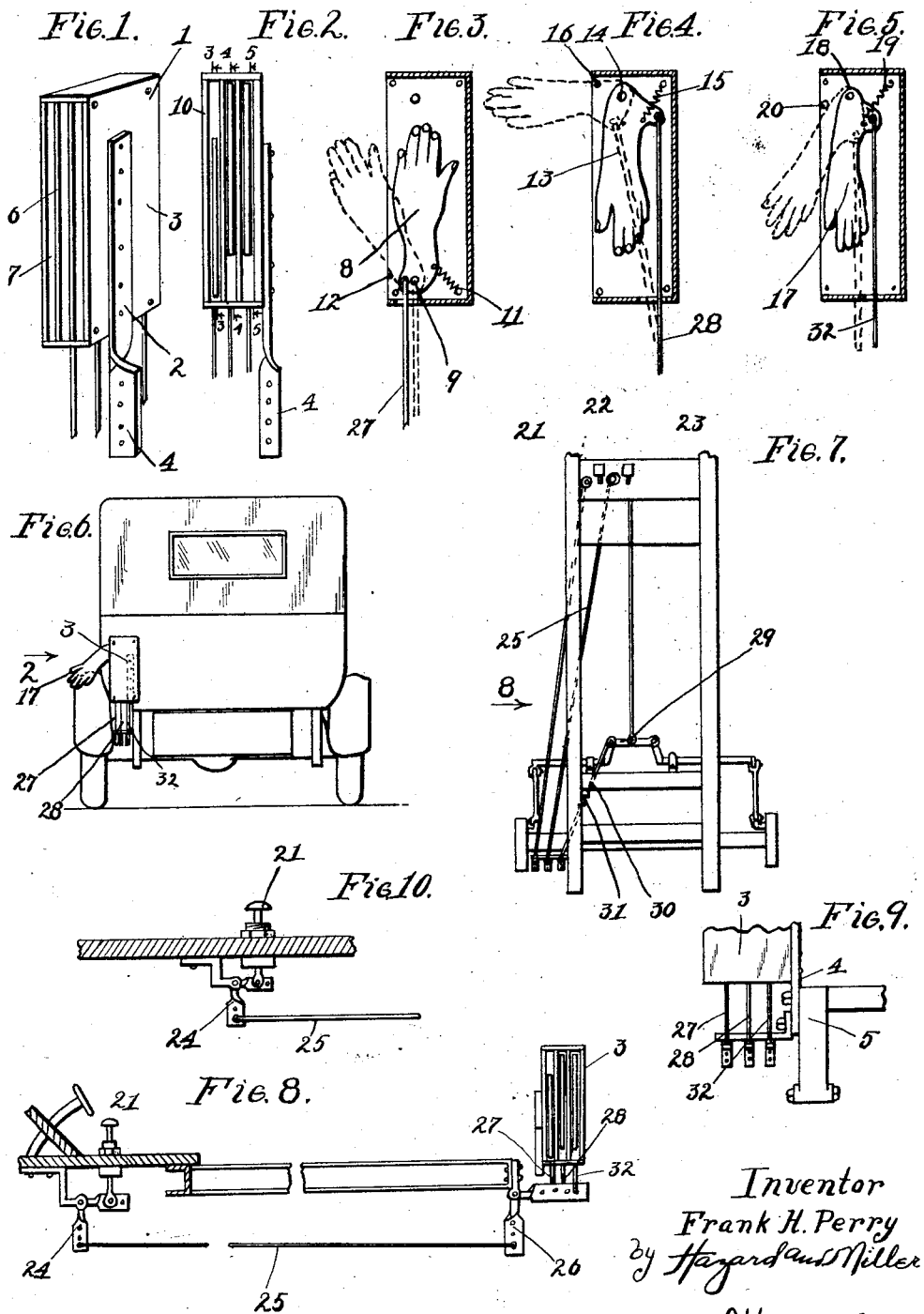
Inventor
Frank H. Perry
by Hazard and Miller
Attorneys.

Patented Sept. 28, 1926.

1,601,600

UNITED STATES PATENT OFFICE.

FRANK H. PERRY, OF LOS ANGELES, CALIFORNIA.

AUTOMOBILE TRAFFIC SIGNAL.

Application filed November 24, 1925. Serial No. 71,209.

My invention is an automobile traffic signal of the semaphore type, adapted to have three moving semaphores to give the various standardized traffic signals.

An object of my invention is to construct a semaphore type of signal suitable for adjustment to the rear end of an automobile having three semaphore arms, two of them being controlled by special pedals to give a right and a left turn signal and the third semaphore being controlled by the brake pedal to give a stop signal.

Another object of my invention is to have semaphore arms giving the different standard signals such as an upward incline of the semaphore for a right hand turn, a horizontal position for a left hand turn, and a downward incline of the semaphore for the stop signal.

In my invention I construct a housing having three compartments, each having a semaphore arm swivelled therein, the right turn semaphore arm is pivoted in the lower part of one of the compartments to swing outwardly at an upward incline of substantially 45 degrees. A left hand turn semaphore arm is swivelled in another compartment from the top to swing outwardly into a horizontal position, and the stop semaphore arm is swivelled at the top of another compartment and is adapted to swing outwardly, having a downward incline of substantially 45 degrees. The first two semaphores are controlled by foot pedals having a special flexible connection therebetween, the stop signal being preferably attached to the brake mechanism.

My invention will be more readily understood from the following description, taken with the drawings in which;

Figure 1 is a perspective view of the housing for containing the semaphore arms or pointers, in operative position.

Fig. 2 is a side view of the housing, showing the separate compartments as if taken on the line 2—2 of Fig. 6.

Fig. 3 is a vertical section of Fig. 2, on the line 3—3 showing the mounting for the right turn signal.

Fig. 4 is a section of Fig. 2 on the line 4—4, indicating the left turn signal.

Fig. 5 is a section of Fig. 2 on the line 5—5, indicating the stop signal.

Fig. 6 is a rear elevation of an automobile showing my traffic signal in operation, indicating a stop signal.

Fig. 7 is a plan view of the operating mechanism, showing part of the framing of the car only.

Fig. 8 is a side view of Fig. 7, taken in the direction of the arrow 8, indicating the connection between the foot pedals and the semaphore arms.

Fig. 9 is a rear view of part of the housing and bell crank levers, showing their attachment to one of the side frames of the vehicle.

Fig. 10 is a sectional detail showing a push pedal for operating either the right or the left signal arm.

Referring particularly to Figs. 1, 2, 6 and 9, a housing 1 is provided with a strap 2 which may be on either its front or rear face, being shown in the drawings on the rear face 3. This strap has a downward extension 4 which may be bolted to one of the side frames 5 of the automobile or any suitable part of the frame or body of the vehicle to hold the housing in firm position. The housing has a pair of partitions 6 forming compartments 7 between the partitions and the front and back walls of the housing, these being utilized for housing the signal pointers.

The right hand turn signal is illustrated particularly in Fig. 3 and is shown as having a signal arm 8 in the form of a hand which is swivelled on a pin 9 adjacent the lower part of the housing, the pin extending between the front wall 10 of the housing and one of the partitions 6. A spring 11 is secured to the arm and to a fixed part of the housing and is adapted to normally hold the pointer retracted in the compartment. A stop pin 12 limits the motion of the pointer, this being actuated as hereafter described.

The left turn signal is shown particularly in Fig. 4 and comprises a signal arm 13 swivelly mounted on the pin 14 located adjacent the top of one of the compartments. A spring 15 normally holds the arm retracted and a stop pin 16 forms a limit to the motion, allowing the arm to swing to a horizontal position.

The stop signal is indicated in Fig. 5, having a signal arm 17 swivelled on the pin 18 located in the upper part of one of the compartments. A spring 19 normally holds the arm retracted and a stop pin 20 limits its motion to allow the arm to swing until it has a downward inclination of substantially 45 degrees.

The controlling mechanism for the signal or semaphore arms is indicated particularly in Figs. 7 to 10, in which foot pedals 21 are located in the driver's compartment adjacent the clutch pedal 22 and brake pedal 23. These foot pedals may be of any suitable type and are indicated as being connected to a bell crank 24 and by means of links 25 connected to the bell cranks 26 at the rear portion of the vehicle, these bell cranks having cords 27 and 28 leading respectively to the right and left signal arms 8 and 13; it being understood that there are separate sets of bell cranks and links for each foot pedal.

The stop signal is controlled through the brake mechanism as follows:

The brake pedal 23 operates an equalizer mechanism 29 to which is connected a link 30 leading to one side of the bell cranks 26. This link has a strong spring 31 connected therein to form a stretchable link for the purpose hereafter explained. The free arm of the bell crank connects to the stop signal arm by a cord 32.

It will be understood that the links 25 and 30 may be if desired made of wire or of rods or equivalent connection.

The manner of operating the signals is substantially as follows:

If a right hand turn is desired, the proper pedal is pressed downwardly by the foot and operates through the bell cranks, the links and cord 27, thus oscillating the signal arm 8, this being swung until it contacts with the stop 12; the arm pointing upwardly at an angle of substantially 45 degrees as indicated in Fig. 3.

The left hand signal is operated substantially in the same manner, the pedal to give such signal being connected to the signal arm 13 and swinging this upwardly until it comes to a horizontal position as shown in dotted lines in Fig. 4.

The stop signal is as above mentioned controlled by the brake, the brake pedal drawing on the equalizer mechanism and transmitting motion through the link 30, the rear bell crank and the cord 32, to the signal arm 17. As it is necessary for this arm to give a stop signal even on the slight application of the brakes, the parts are so proportioned so that the slightest movement of the brake pedal in applying the brakes is sufficient to swing the signal arm 17 into engagement with the stop 20 inclined downwardly at substantially an angle of 45 degrees. The application of the brakes for instance in jamming them on tight, stretches the spring 31 still holding the stop signal in the position indicated in dotted lines in Fig. 5.

It will thus be seen from the above description that independent pedals operate individual and independent semaphore signal arms and that these arms are housed in separate compartments thus causing no interference one with the other and that on the release of the pedals the arms are retracted within the housing compartments by the springs connected thereto.

It is obvious that the various details of my invention may be altered, as hand levers or the like could be used instead of foot pedals for controlling the right and left signal and the stop signal could be connected to any suitable part of the brake mechanism.

Other features of my invention may be altered in general construction or specific details to suit different types of signals and different ways of mounting the housing for the semaphore arms, such changes being within the spirit of my invention as set forth in the specification, drawings and claims.

Having described my invention, what I claim is:

1. An automobile traffic signal comprising a housing having a plurality of signal arms pivotally mounted within the housing, some of the signal arms being secured at the bottom and some at the top of said housing, and independent means to swivel said signal arms different portions of a turn.

2. An automobile traffic signal comprising in combination a housing, a plurality of signal arms pivotally mounted in said housing to normally occupy a substantially vertical position, one of said signal arms being adapted to swing outwardly with an upward incline of substantially 45 degrees, another arm being adapted to swing outwardly horizontally and a third arm being adapted to swing outwardly with a downward incline of substantially 45 degrees and pedal means to operate said signal arms.

3. An automobile signal comprising in combination a box-like housing open at one side, a signal arm pivotally mounted therein in the lower part of the housing to swing outwardly, having an upward inclination of substantially 45 degrees, a second signal arm pivotally connected to the upper part of the housing to swing outwardly into a horizontal position, a third signal arm pivotally connected to the upper part of the housing to swing outwardly, having a downward inclination of substantially 45 degrees, and means operatively connected with an operator's compartment of an automobile to actuate said signal arms.

4. An automobile traffic signal comprising in combination a housing having a plurality of separate compartments open at one side, three signal arms swivelly mounted in said compartments, these being pivoted at the top and bottom of the compartments, a first signal pivoted to the bottom being adapted to swing outwardly to have an upward inclination of substantially 45 degrees, a second signal arm pivoted to the top of the compartment being adapted to swing outwardly horizontally, a pair of pedals, an operative connection between the said pedals to the first and second signal arm, a third signal arm pivoted in the upper part of a compartment and adapted to swing outwardly, having a downward inclination of 45 degrees, and means operatively connecting the third signal arm with the brake mechanism of an automobile.

5. In an automobile traffic signal, a substantially rectangular box-like housing having a pair of partitions therein forming three compartments open at one side, a signal arm in one of the compartments pivotally mounted at the lower part thereof, said arm being adapted to swing outwardly, having an upward inclination of 45 degrees, a spring to retract the arm, a second arm pivoted at the upper end of one of the compartments, adapted to swing outwardly into a horizontal position, a spring to retract said arm, a third arm pivoted in the upper part of one of the compartments, adapted to swing outwardly having a downward inclination of 45 degrees, a spring to retract said arm and independent pedal operating means operatively connected to each of the said signal arms.

In testimony whereof I have signed my name to this specification.

F. H. PERRY.